United States Patent
Verret

(10) Patent No.: US 7,547,246 B1
(45) Date of Patent: Jun. 16, 2009

(54) METHOD AND APPARATUS FOR MANUALLY REMOVING MEAT FROM GULF COAST BLUE CRAB

(76) Inventor: Paul A. Verret, 125 Ridgeview Dr. Apt E6, Broussard, LA (US) 70518

( * ) Notice: Subject to any disclaimer, the term of this patent is extended or adjusted under 35 U.S.C. 154(b) by 189 days.

(21) Appl. No.: 11/604,085

(22) Filed: Nov. 22, 2006

(51) Int. Cl.
*A22C 29/02* (2006.01)
(52) U.S. Cl. .......................................... 452/6
(58) Field of Classification Search ................ 452/1–7, 452/13, 17; 30/120.1, 107, 309, 356
See application file for complete search history.

(56) References Cited

U.S. PATENT DOCUMENTS

| | | | |
|---|---|---|---|
| 845,521 A * | 2/1907 | Carlson | 452/16 |
| 2,000,075 A * | 5/1935 | Hallock | 452/16 |
| 2,069,094 A * | 1/1937 | Leahey | 452/16 |
| 2,136,816 A * | 11/1938 | Frazier | 452/16 |
| 2,520,790 A * | 8/1950 | Wesik | 452/16 |
| 3,696,465 A * | 10/1972 | Rossnan | 452/8 |
| 3,696,849 A | 10/1972 | Davis | |
| D247,603 S | 3/1978 | Grossman | |
| 4,247,984 A | 2/1981 | McArdle et al. | |
| 4,535,507 A * | 8/1985 | Reinke | 452/1 |
| 5,830,048 A | 11/1998 | Wurzbacher | |
| 5,830,049 A * | 11/1998 | Haley et al. | 452/6 |
| D450,224 S | 11/2001 | Dweck | |
| 7,066,802 B1 * | 6/2006 | Girton | 452/1 |

* cited by examiner

*Primary Examiner*—Thomas Price
(74) *Attorney, Agent, or Firm*—Robert N. Montgomery

(57) ABSTRACT

Apparatus and method for preparing cooked crabs for fast separation of lump crab meat from shell by a manual cleaving action is disclosed. The apparatus comprises a cutting board, having a cleaving means for severing a crab body in three easy steps. The cleaving means is used to sever the crab body along three imaginary lines as directed by instructional illustrations located on the cutting board. The cleaving means severs the crab body from the under side into three portions along diagonal imaginary lines extending between the front and rear of the crab. A third cut is made centrally along the central portion but does not cut through the upper shell of the crab thereby releasing the breastplate of crab with the lump crabmeat attached thereto for easy removal.

15 Claims, 6 Drawing Sheets

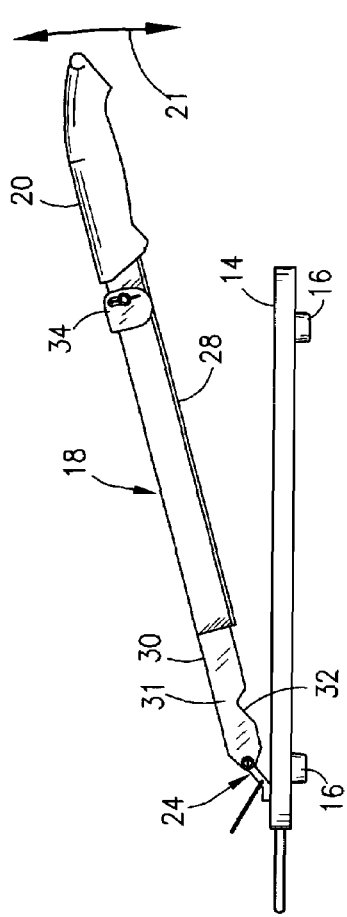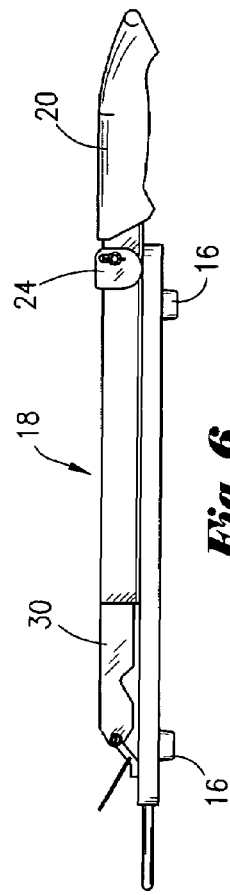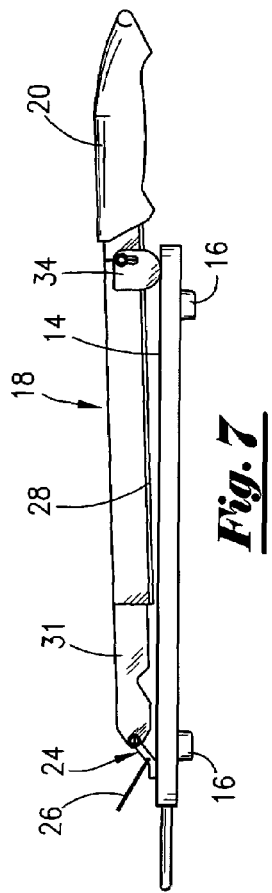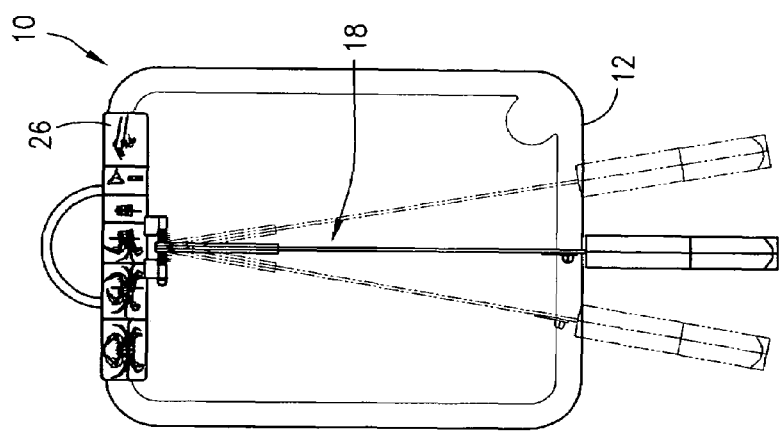

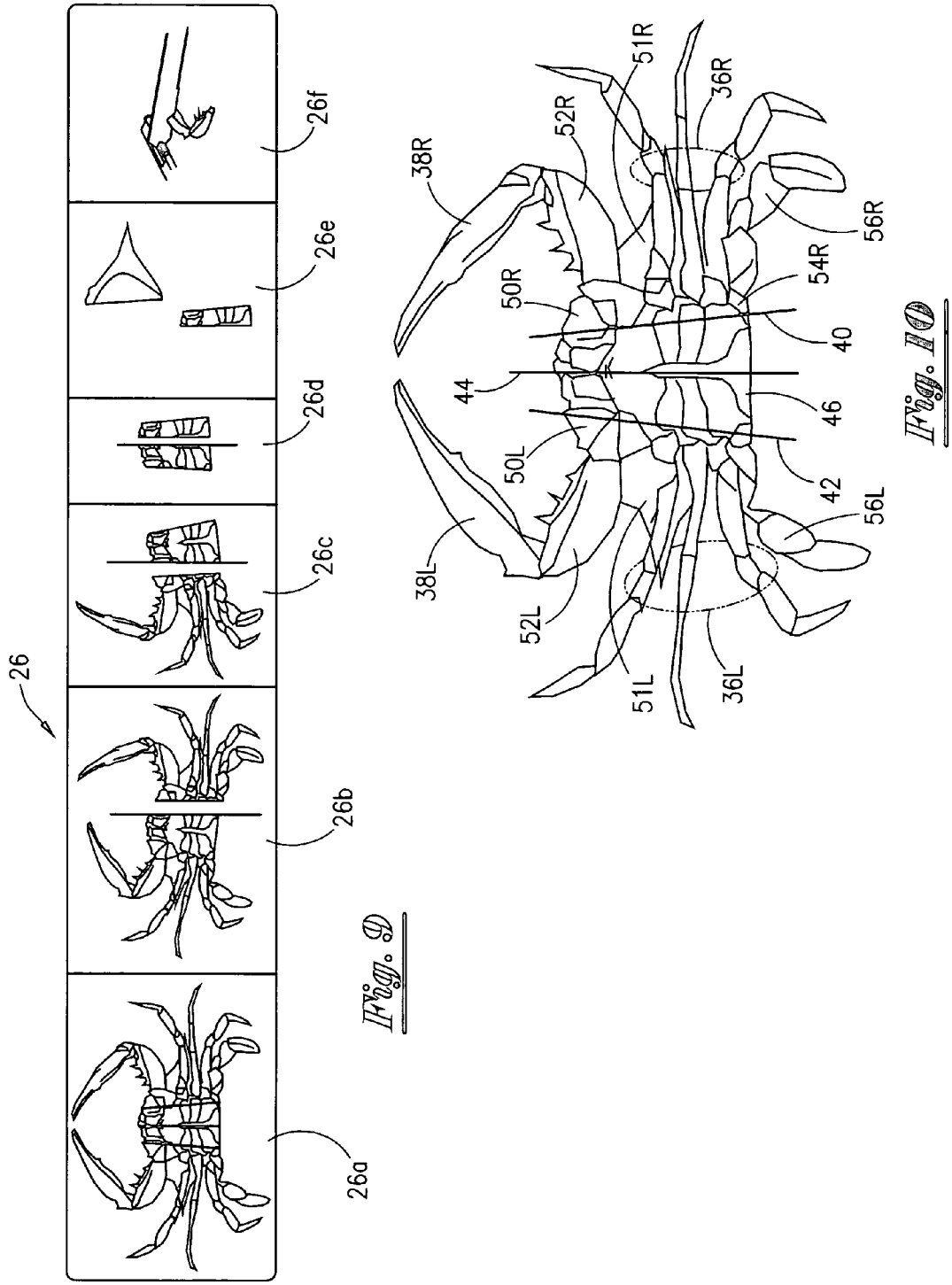

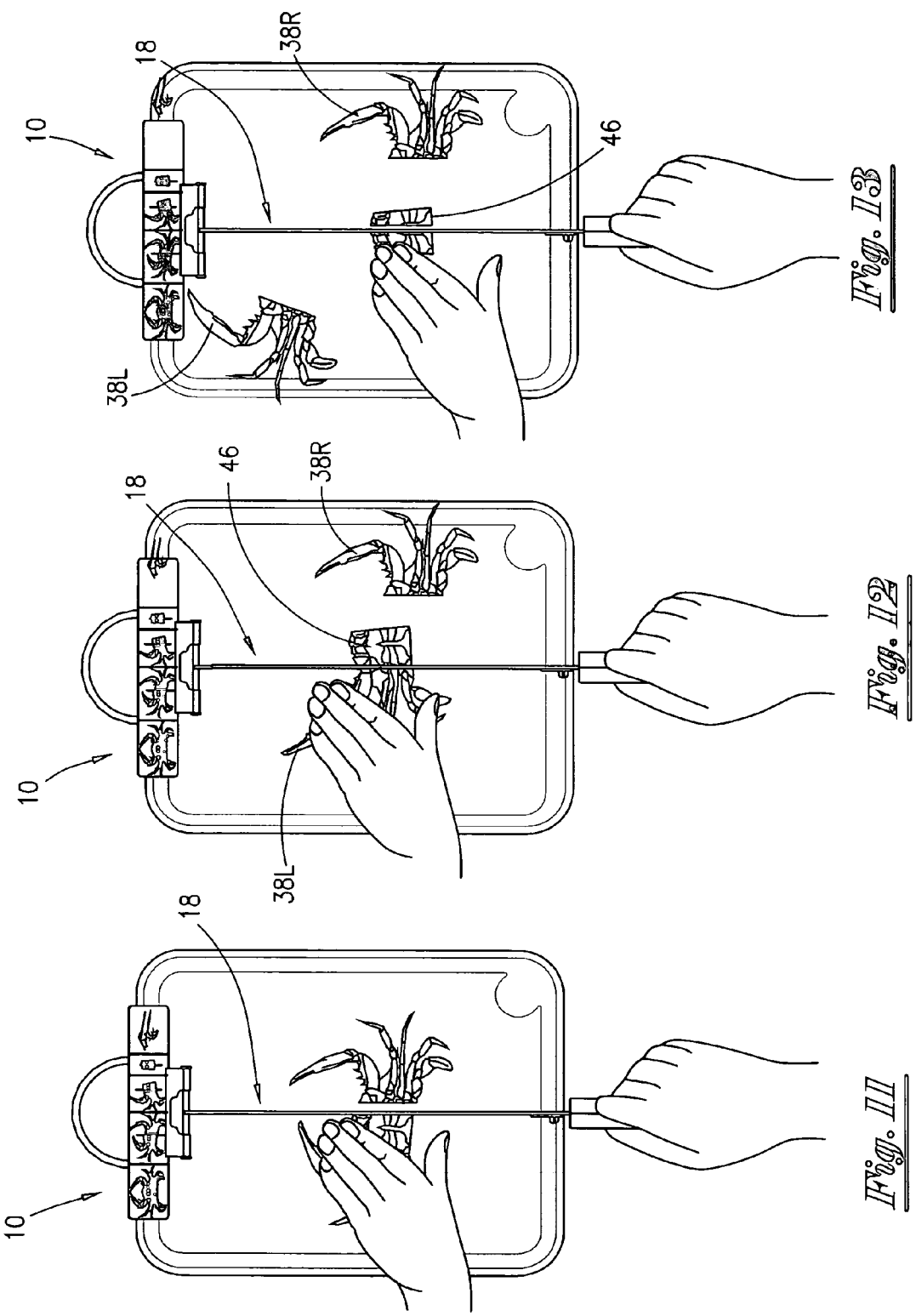

METHOD AND APPARATUS FOR MANUALLY REMOVING MEAT FROM GULF COAST BLUE CRAB

1. FIELD OF THE INVENTION

This invention relates generally to the dissection of a cooked crab in order to facilitate hand picking of the edible meat from the body, claws, and leg portions and more particularly to a manual device used to perform the dissection and a method for performing such dissection.

2. GENERAL BACKGROUND

Removing crabmeat from the shell structure of a cooked crab body by hand is a messy operation and requires the shell to be broken, usually with a mallet. Each crab is usually handled several times as the meat is extracted.

A variety of machines have been developed to extract the edible crabmeat from the crab shell quite effectively. However, hand picking of crabmeat is still quite time consuming and requires some degree of dexterity. In some cases where dexterity is impaired or speed is a premium benefit, additional apparatus are usually employed. For example once the crabs have been cooked and cooled sufficiently for handling, the legs and claws are removed in some manner and the crab body is cleaved into halves. At this point in the process, crabmeat extraction devices are employed for pressing the crabmeat from each half. While great care may be taken during the pressing process, some meat is left in the shell structure, and a great number of shell fragments also find their way into the meat along with other inedible portions. Such pressing operations do not generally provide a method for removing the meat from the crab claws without first cracking them by another means.

Those skilled in the art of processing crabs by cutting and extracting the meat utilizing automated machines are well aware of the need to remove the legs and claws prior to orienting and fixing the crab in position for cutting the shell. The process for removing the legs and claws is not considered an important aspect of crab processing. However, manual processing of a cooked crab requires forethought regarding how to attack the crab in an orderly manner. Therefore, orientation of the crab and the manual removal of the legs and claws as a first step is a serious consideration. Unfortunately, there are no instructions on the crab to inform those who may be unfamiliar with the creatures as to how to make entry and what parts are edible. Therefore, it is an object of this invention to provide manual methods and apparatus for rapidly preparing crab bodies with minimum effort and minimum loss of edible meat.

It is still another object of the present invention to provide illustrative instructions for removal of the legs, claws, and swimmer legs from the crab body and the proper severing of the body in order to reduce the dexterity required for removing the meat.

3. SUMMARY OF THE INVENTION

The instant invention utilizes a cutting board with a pivotal cutting blade having a notch therein for manually cracking crabs in a fast and efficient, streamlined manner. The relatively small cutting board has instruction panels for teaching those who may be unfamiliar with the process of dissecting a crab and removing only the edible white lump crab meat for consumption. The cutting process is used in the kitchen for fast preparation of various dishes that utilize boiled crabmeat or at tableside for use by diners who prefer to dine on fresh boiled crabs in the shell.

It is therefore an object of the invention to provide a dissecting tool for quickly extracting the edible white meat portion of a cooked crab, including the crab claws, using a pivotal knife and cutting board.

It is a further object of the invention to provide a quick reference dissection guide in the form of illustrated instruction panels attached to the cutting board.

It is still another object of the invention to provide a more efficient method of dissecting a boiled crab by handicapped individuals.

Another object of the invention is to provide an easier method for dissecting a cooked crab without using a hammer or by squeezing methods.

Another object of the invention is to provide a manual cooked crab dissection apparatus that is easily cleaned and sanitized.

4. BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 4 is top view of the crab cutting board and pivotal cleaving arm assembly;

FIG. 5 is a side elevation view of the manual crab cutter with cleaving arm elevated;

FIG. 6 is a side elevation view of the manual crab cutter with the cleaving arm in through-cut mode;

FIG. 7 is a side elevation view of the manual crab cutter with cleaving arm stopped in the extended position;

FIG. 9 is front view of the instruction card;

FIG. 10 is a top view of the underside of a crab showing imaginary dissection lines;

FIG. 11 is a top view of the right side dissection of the claws and legs;

FIG. 12 is a top view of the left side dissection of the claws and legs;

FIG. 13 is a top view of the central dissection of the crab breast;

5. DETAILED DESCRIPTION OF THE PREFERRED EMBODIMENT

Figure 1:
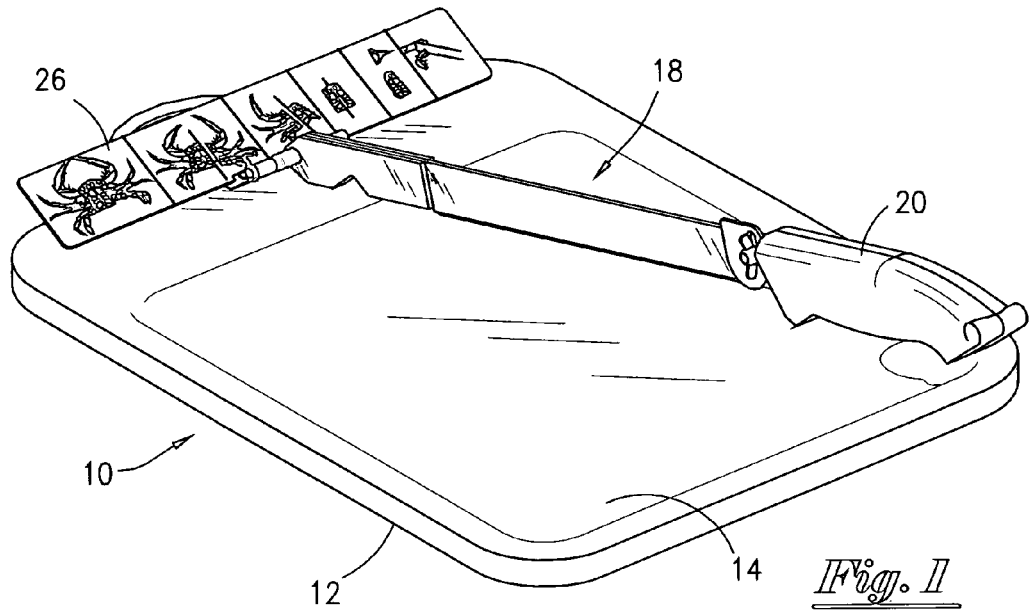
FIG. 1 is an isometric view of the preferred embodiment of the manual crab cutter.
Figure 2:
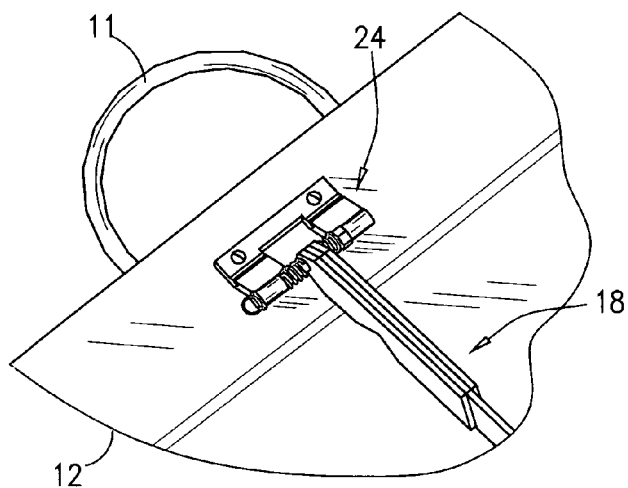
FIG. 2 is a partial isometric view of the crab cutting board and cleaving arm pivotal assembly.
Figure 3:
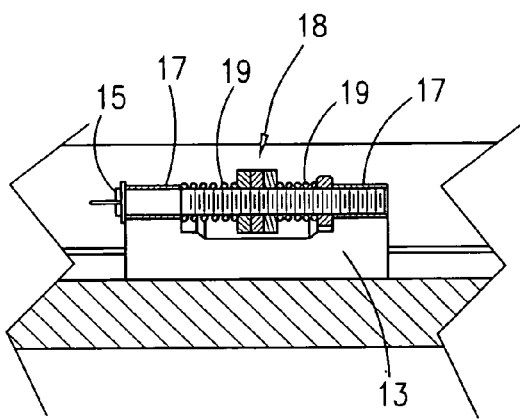
FIG. 3 is partial cross-section view of the crab cutting board and pivotal assembly.

The manual crab cutter assembly 10 seen in FIG. 1 includes a cutting board 12 having a textured surface area 14 on the upper or cutting side and non-skid legs members 16 located on the opposite side, as shown in FIG. 5. Cutting board 12 is fitted with a handle 11, as seen in FIG. 2, that may be used for hanging the cutting assembly 10 vertically. Cutting board 12 is also fitted with a pivotal elongated cutting or cleaving arm assembly 18 having a handle portion 20 at one end and an elongated hole at the opposite end for connecting to a biased quick release pivoting pin assembly 24 for easy disassembly and cleaning. Pivotal pin assembly 24, as seen in FIG. 3, includes an offset hinge-like member 13 having barrels 17 at each end for receiving the pull pin 15. A biasing means in the form of a pair of springs 19 provides the necessary friction on the cleaving arm assembly 18 during rotation to maintain the cleaving arm in a sustained position after each cut along its pivotal arc 21, as shown in FIG. 5. It should be noted that the elongated pivotal hole in the cleaving arm and the biasing springs 19 allow the cleaving arm 18 to be pivotal in two planes without rotating the pivot pin 24, as seen in FIG. 4. Cutting board 12 is also fitted with a holder such as notch in the board or some type of clip for inserting a display card 26, as first illustrated in FIG. 1, having illustrative instruction panels thereon displaying a step-by-step crab dissection process.

The cleaving arm assembly 18, shown in more detail in FIG. 5, includes a cutting portion 28, a non-cutting portion 30, a notched portion 32, and an adjustable stop member 34 located adjacent the cleaving arm handle 20.

The cutting portion 28 extending along the lower edge of the arm may be beveled on one or both sides but not to the extent that it is considered to be a slicing knife edge, for obvious safety reasons, and that the cleaving arm assembly 18 is only used to cut in a chopping manner. This cleaving arm 18 is intended for severing by cracking through cartilage rather than to cut like a knife. Only a portion 28 of the cleaving arm 18 is beveled, generally no more than 8 inches. The adjustable stop 34 is pivotally adjustable to insure that the cutting portion 28 does not contact the cutting surface 14 in the non-severing mode, thus preventing the cleaving arm from fully severing the upper portion of the crab shell when dissecting the breast portion. The notch portion 32 of the cleaving arm assembly 18 is encased in a hard polymeric sheath 31 that makes the notched portion 32 of the cleaving arm 18 considerably wider than the cutting portion 28 and is used to crack open various portions of the crab claws and legs. The flat or non-beveled portion 30 of the cleaving arm assembly 18 is also used for cracking some portions of the crab claw arms. It should be noted that the flat portion 30 of the cleaving arm 18 and the notch 32 do not contact the cutting surface 14 when the cleaving arm is in the through-cut mode with the stop 34 in the non-extended position, as seen in FIG. 6.

As further seen in FIG. 7, the adjustable stop 34 may be extended to prevent the cutting edge 28 from contacting the cutting surface 14.

Figure 8:
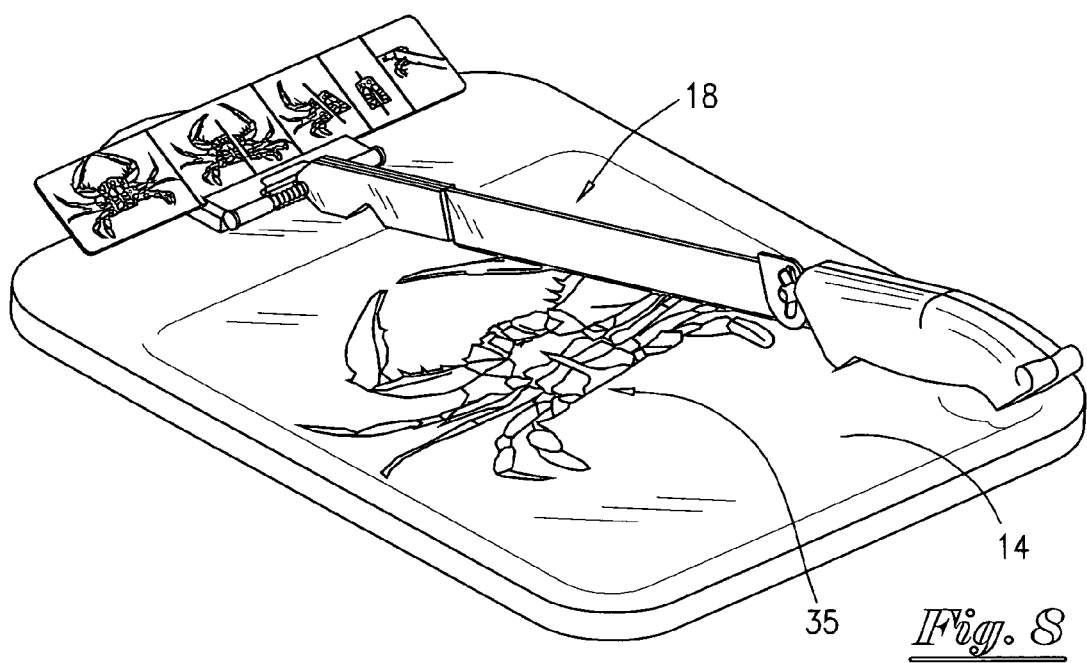
FIG. 8 is an isometric view of the manual crab cutter assembly with a crab on the board.

As shown in FIG. 8, a boiled crab 35 is first placed on the cutting surface 14 beneath the centrally located cleaving arm assembly 18 and positioned with the underside of the crab facing upwards. Now, referring first to the display or instruction card 26, shown in FIG. 9, and as directed by the first instruction panel 26a, and as illustrated and enlarged in FIG. 10, we see that we only need to cut the crab in three easy steps by making three cuts along the body portion 46 of the crab 35 along imaginary lines 40, 42, 44 as shown in FIG. 10. The first cut along line 40, shown in instruction panel 26b and further illustrated in FIG. 11, separates the right side legs 36R and claw 38R from the body portion 46 by cutting along an imaginary line 40 extending from the base of the first knuckle 50 of the crab claw arm 52R to the base of the first knuckle 54R of the last swimmer leg 56R. This cut 40 is a through cut severing the legs 36 and the "V" shaped tip portion 51 of the upper shell (not shown here). Therefore, the adjustable stop member 34 is set so that the cutting portion 28 of the cleaving arm assembly 18 makes contact with the cutting surface 14.

The body portion 46 is then positioned, as shown in FIG. 12, for making a second cut along the imaginary line 42, as shown in instruction panel 26c of the instruction card 26 and FIG. 10, thus severing the left side claw 38L and legs 36L from the body portion 46 in the manner described above for the right side.

Figure 14:
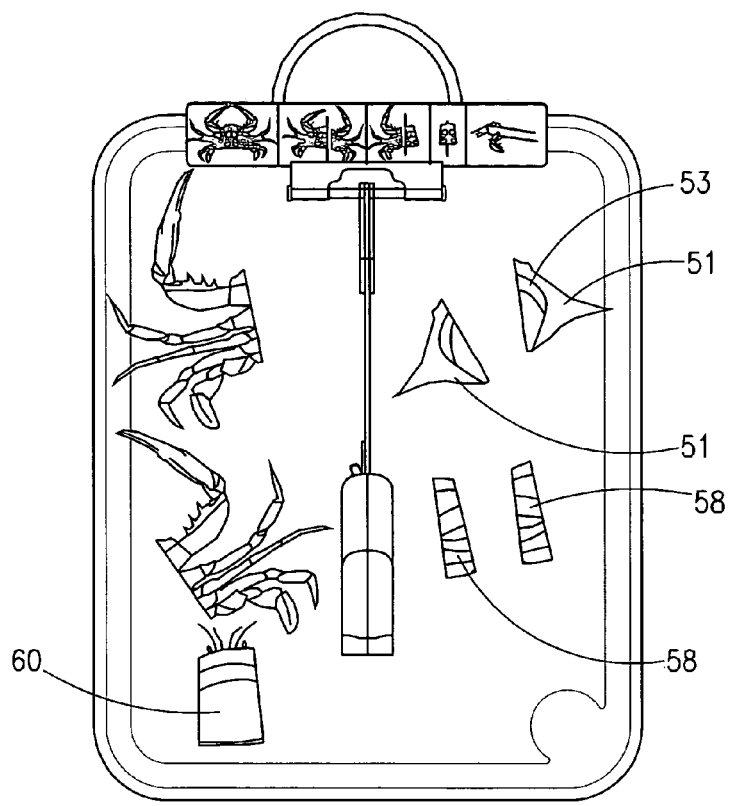
FIG. 14 is a top view of the various elements of the dissected crab.

The legs 36L, 36R and crab arms 52R and 52L may now be removed manually from the "V" shaped portion 51 of the top shell, thereby revealing a fatty deposit 53, as seen in FIG. 14, which may be easily removed for use in sauces, dips and gumbo stock. Some consider this a rare delicacy that is often overlooked or ignored.

Body portion 46 may now be positioned for cutting along the imaginary line 44 as seen in FIG. 10. By utilizing the cleaving arm with the adjustable stop member 34 set in a non-severing mode, thus preventing a through cut, a cut may be made severing only the underside breastplate 58, as shown in FIG. 14, of the crab into two portions as directed in instruction panel 26d and illustrated in FIG. 13. This procedure allows the two severed breast portions 58 of the breastplate to be separated from the upper shell portion 60, as shown in FIG. 14. This allows the breastplate portions 58 to be lifted away from the upper shell portion 60, as directed in instruction panel 26e, thus exposing the white lump crabmeat attached to the breastplate. The lump crab meat may then be removed from the breast plate portions 58 and served on a dinner plate or in specialty dishes such as crab au gratin or the breast plates and lump crab meat may simply be placed whole on the dinner plate or placed in bowls with gumbo.

Figure 15:
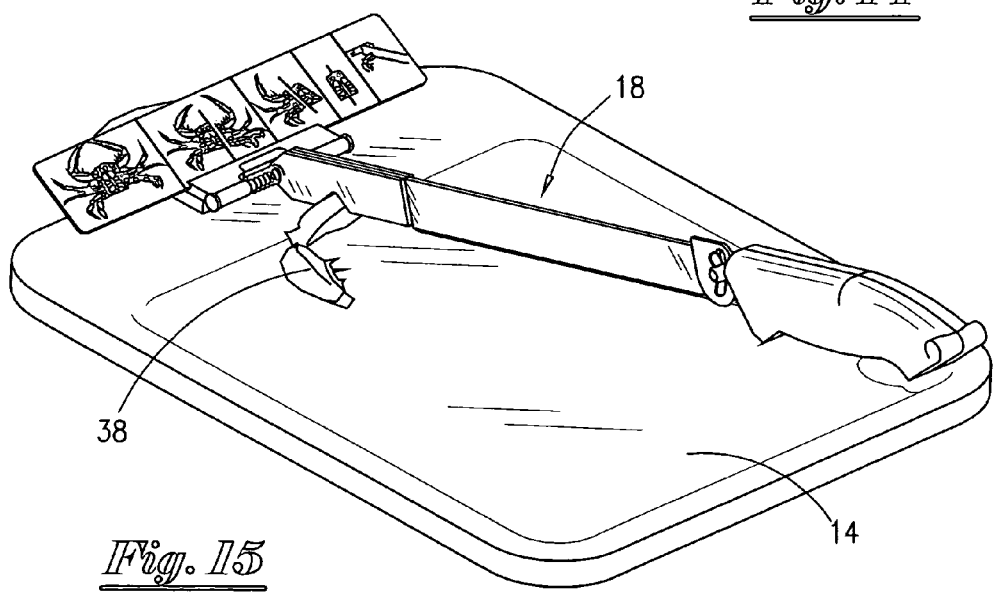
FIG. 15 is a top view of the crab cleaving arm used to break crab claws and legs.

Finally, as directed by instruction panel 26f of the illustration instruction panel 26, the notch 32 and flat portion 30 of the cleaving arm assembly 18 is used, as shown in FIG. 15, for cracking the crab arms 52R, 52L and claws 38 for extraction of the meat within.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A method for manually dissecting a crab cooked in its shell using a severing apparatus comprising the steps of:
   a) placing a whole cooked crab on a portable cutting board having a manually manipulated elongated cleaving arm pivotally attached thereto with the underside of the crab facing upwards;
   b) severing legs and claws from each side of the crab using the cleaving arm by through-cutting the crab body along an imaginary line extending through the base of the first knuckle of the crab claw arm to the base of the first knuckle of the swimmer leg; and
   c) severing the breastplate of the remaining crab body portion into two portions by using the cleaving arm in a manner whereby the upper shell portion is detached.

2. The method for manually dissecting a crab according to claim 1 further comprising the step of cracking portions of the crab arms and claws using a notched non-cutting portion of the cleaving arm.

3. The method for manually dissecting a crab cooked in its shell using a severing apparatus according to claim 1 wherein the method comprises a three step severing procedure.

4. The method for manually dissecting a crab cooked in its shell using a severing apparatus according to claim 3 wherein the severing procedure comprising the step of severing the crab claws and legs from each side further comprises the severing of a portion of each side of upper shell of the crab.

5. The method for manually dissecting a crab cooked in its shell using a severing apparatus according to claim 4 wherein the step of removing a portion of the upper shell with the claw and legs further comprises the step of manually removing the legs and claw from the upper shell portion thus exposing a fatty tissue deposit and removing the fatty tissue from the upper shell.

6. A manually operated cooked crab-severing apparatus comprising:
   a) a crab cutting board;
   b) a cleaving arm assembly having a handle at one end and a cutting portion and a non-cutting portion along a lower edge in parallel contact with said cutting board;
   c) a pivoting means attached to said cutting board and to said cleaving arm at end opposite said handle for pivoting said cleaving arm in a vertical plane;
   d) a means located within said non-cutting portion of said cleaving arm adjacent said pivoting means for cracking crab legs; and
   e) a biased friction means for sustaining said cleaving arm in an unsupported position.

7. The manually operated cooked crab-severing apparatus according to claim 6 further comprising a means for attaching a card member having crab-dissecting illustrations.

8. The manually operated cooked crab-severing apparatus according to claim 6 further comprising a means for hanging the board vertically.

9. The manually operated cooked crab-severing apparatus according to claim 6 wherein the cleaving arm assembly is located perpendicular to a horizontal pivot pin assembly having a means for allowing the cleaving arm to be pivotal in two planes.

10. The manually operated cooked crab severing apparatus according to claim 9 wherein the horizontal pivot pin assembly is centrally located relative to the cutting board.

11. The manually operated cooked crab severing apparatus according to claim 10 wherein the pivot pin assembly comprises a removable pivotal pull pin for separating the cleaving arm from the cutting board.

12. The manually operated cooked crab severing apparatus according to claim 6 wherein at least the non-cutting portion of the cleaving arm has a width greater than the cutting portion.

13. The manually operated cooked crab severing apparatus according to claim 12 wherein the non-cutting portion of the cleaving arm further comprises a polymeric member attached to each side.

14. The manually operated cooked crab severing apparatus according to claim 6 wherein the cleaving arm further comprises an adjustable pivotal stop means located adjacent the handle portion for supporting one end of the cleaving arm upon the cutting board.

15. A method for manually dissecting a crab cooked in its shell using a severing apparatus comprising the steps of:
   a) placing a whole cooked crab on a portable cutting board having a manually manipulated pivotal cleaving arm the cleaving arm having a notch for cracking claws;
   b) positioning the crab on the cutting board so that the underside of the crab is turned upwards;
   c) using the cleaving arm to make a single diagonal cut along an imaginary line extending through the base of the first knuckle of the crab's left claw arm to the base of the first knuckle of the crab's left swimmer leg;
   d) repositioning the crab and repeating the process of c) for the crab's right side;
   e) dissecting the remaining body portion of the crab with the cleaving arm by making a single cut cleaving the body portion into two portions; and
   f) using the cleaving arm to crack a portion of the crab claw and arm members.

\* \* \* \* \*